April 9, 1929. W. W. RIEDEL 1,708,191
LOCATING INSTRUMENT
Filed Feb. 23, 1927    2 Sheets-Sheet 2

Inventor
Walter W. Riedel
By Spencer, Hardman and Fehr
Attorney

Patented Apr. 9, 1929.

1,708,191

UNITED STATES PATENT OFFICE.

WALTER W. RIEDEL, OF DAYTON, OHIO, ASSIGNOR TO DELCO-REMY CORPORATION, OF DAYTON, OHIO, A CORPORATION OF DELAWARE.

LOCATING INSTRUMENT.

Application filed February 23, 1927. Serial No. 170,230.

The present invention relates to a locating instrument particularly adapted to locate two points equidistant to a given intermediate point or line in a different plane. It is among the objects of the present invention to provide a sturdy instrument of simple structure and design for accurately locating and moving parts of a machine into proper relative positions with an intermediate member thereof.

Further objects and advantages of the present invention will be apparent from the following description, reference being had to the accompanying drawing wherein a preferred embodiment of one form of the present invention is clearly shown.

Figure 4:
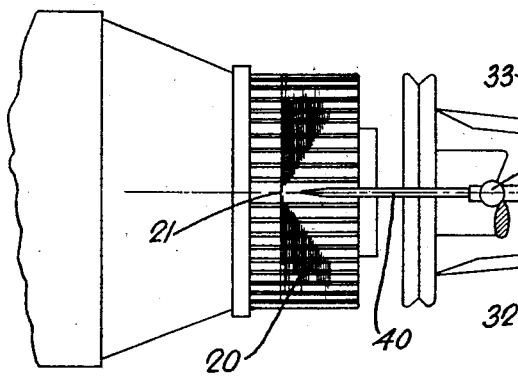
Fig. 4 is a fragmentary plan view of the device applied to an armature.
Figure 6:
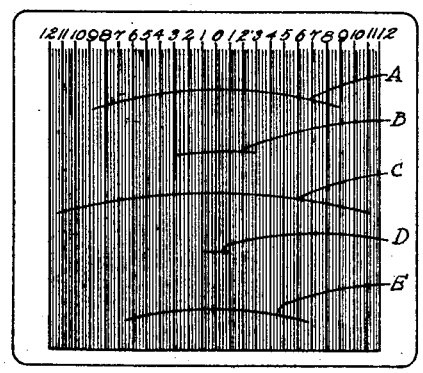
Fig. 6 is a view of a chart showing the amplitude of vibrations.

The present application defines the device as used for locating balancing weights on armatures. As disclosed in the co-pending application of William Grant Pontis, Serial Number 120,587, filed July 6, 1926, unbalanced armatures may be provided with receptacles in which balancing weights are secured for purposes of counter-balancing the armature. The first step in the operation, as described in this said application, comprises the determination of the plane and amplitude of unbalance. For this purpose the armature is placed in a machine which is provided with markers, one of which will place marks as indicated by the numeral 20 in the Fig. 4, on the commutator of the armature, converging as indicated at 21, indicating the plane of unbalance, or more specifically the lighter side of the armature. The other marker provides indications on a chart shown in the Fig. 6, defining the amplitude of unbalance. The same size and shape counter-balancing weights are used for counter-balancing all armatures of a standard size. The relative positions of the two weights are governed by the amplitude of unbalance of the various armatures. By experiment a record is established by means of which it may be ascertained quickly, what the spacing of the balancing weights should be for certain amplitudes of unbalance. Such a record may comprise perforated discs, or it may comprise a chart as illustrated in the Fig. 7. In the chart the ordinates define the amplitudes of unbalance while the abscissæ define the spacing of the weights, as indicated by the graduations 62 provided on the plate 64 of the locating instrument. Thus when the plane of unbalance is designated by a line on the chart, as indicated at "E" in the Fig. 6, which line approximates 6.75, the spacing of the locating instrument would be substantially at graduation 12.25.

For the present purpose the instrument is used not only to obtain the proper location of the weights, but it is also used to move said weights in their retainers to said proper locations. This requires an instrument not only of precision, but also of strength and durability.

Figure 1:
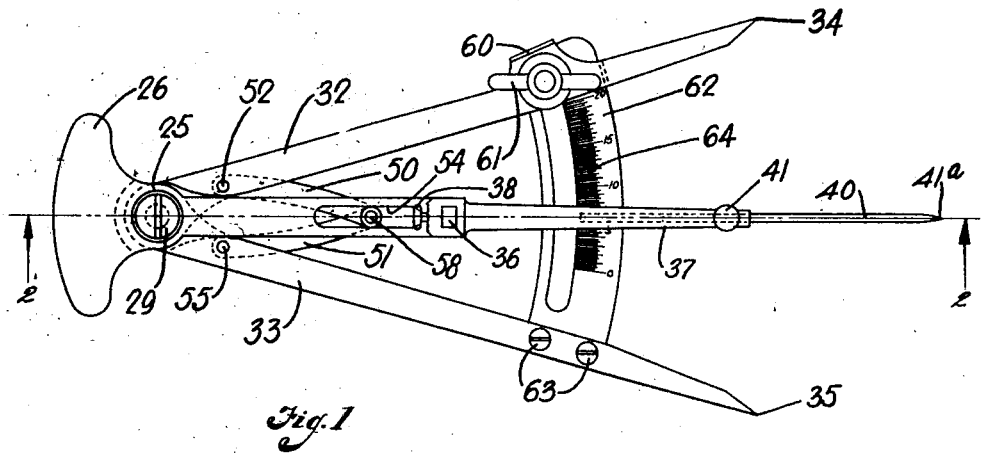
Fig. 1 is a plan view of the instrument.
Figure 2:
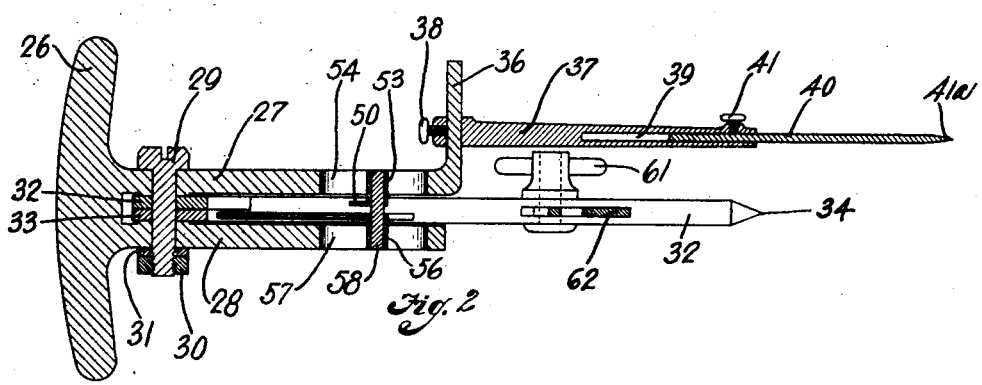
Fig. 2 is a cross section take along the line 2—2 of Fig. 1.
Figure 3:
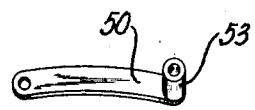
Fig. 3 is a perspective view of a member of the device.
Figure 5:
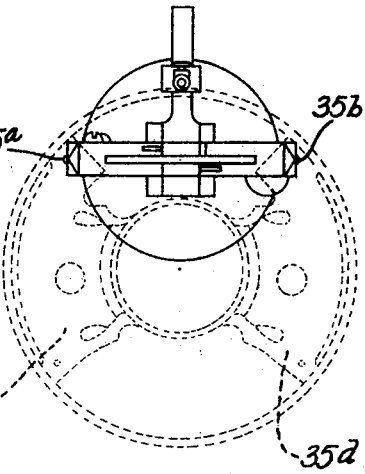
Fig. 5 is an end view of the device as applied to an armature, which is shown in dotted lines.

The present device comprises a supporting member 25, which includes the handle portion 26 and the yoke portion including branches 27 and 28 spaced as shown in the Fig. 2. A screw stud 29 passes through aligned apertures in the branches 27 and 28 adjacent the handle 26, said screw being provided with a nut 30 and a lock washer 31 which securely holds the screw stud in position. A pair of indicator arms 32 and 33 are coaxially pivoted on the screw stud 29, the arm 32 lying on one side of the branch portions of the supporting member, while the arm 33 lies on the opposite side thereof. The free ends of the arms 32 and 33 are pointed as at 34 and 35 respectively, said points being adapted to be inserted in indents provided in the balancing weights as shown in the Fig. 5, whereby said weights may be rotated in unison about the axis of the shaft for purposes of locating them in proper relation with the plane of unbalance of said shaft.

At the end of the branch 27 there is provided an upturned angular portion 36 upon which is slidably fitted the pointer receiving arm 37 which is held in adjusted position on said angular portion by means of the clamping screw 38. The pointer receiving arm 37 is in longitudinal alignment with the branch 27. It is provided with a passage 39 for receiving the pointer 40, the screw 41 holding said pointer in the adjusted position relative to the arm 37.

The means for automatically maintaining the pointer 40 centrally between the arms 32 and 33 so that the distance between the point 41$^a$ of the pointer and the points 34 and 35 of the indicator arms remain equal regardless of the adjusted position of the arms comprise the levers 50 and 51. Lever 50 has its one end anchored to the arm 32 as shown at 52, the other end of said lever being provided with an elongated hollow bearing portion 53, which extends into an elongated slot 54 provided in the branch 27. Lever 51 is pivotally secured to the arm 33 as at 55, the other end of said lever being provided with an elongated hollow bearing portion 56 which extends into the elongated slot 57 provided in the branch 28. A pin 58 fits snugly in the bearing portions 53 and 56 of levers 50 and 51 respectively, said pin 58 maintaining aligned operation of said bearing portions in their respective slots. Thus arms 32 and 33 having levers 50 and 51 pivotally secured thereto, which levers are coaxially secured at their other ends to a common pin, it is apparent that the arms when operated will move concurrently in opposite directions and through equal arcs. This construction also maintains the branches 27 and 28 centrally of said arms 32 and 33 due to the sliding movement of the bearings of said levers 50 and 51 in the elongated slots 54 and 57 provided in said branches. Thus the pointer 40, which has been described, is in longitudinal alignment with the branches 27 and 28, will also be maintained centrally of the arms 32 and 33.

The pointer supporting arm 37 is adjustable on the angular portion 36 in a direction at right angles to the plane in which the indicator arms move so that said pointer may be adjusted for use in armatures having different sized commutators.

Figure 7:
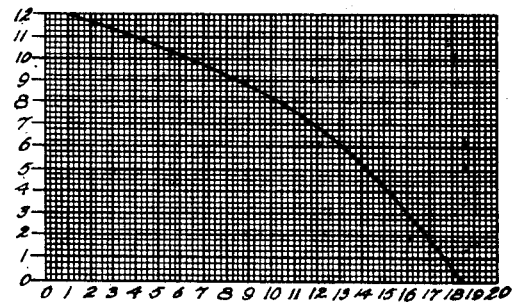
Fig. 7 is a chart determining adjustment of the locating instrument.

In practice when it is ascertained that the amplitude of an armature is 6.75 for instance, the chart illustrated in Fig. 7 indicates that the instrument should be set at 12.25. The knife edge surface 60 provided on the arm 32 is brought into alignment with the graduations indicated at 12.25 and the thumb screw 61 is then tightened, which operation clamps the plate 62 tightly between apertured portions of the arm 32, thus locking said arm to the plate 62. The other end of the plate is anchored to the arm 33 by means of the screws 63 so that when the thumb screw 61 is tightened, the arms are located against movement. Graduations 64 correspond to the abscissæ of the chart shown in Fig. 7.

After being set, the pointers 34 and 35 of the instrument are inserted in the indents 35$^a$ and 35$^b$ of the cooperating weights 35$^c$ and 35$^d$, thus properly spacing said weights according to the amplitude of unbalance of the shaft or armature. Then the weights are rotated in their receptacles about the axis of the shaft and through the agency of the locating instrument until the pointer 41 aligns with the point 21 indicating the plane of unbalance and the lighter side of the armature. Thus the weights are properly located on the unbalanced armature and may be so held in position by the locating instrument until they are secured to the receptacle.

Although the device is shown and described in the present application as being used to locate balancing weights in proper balancing position on a rotatable shaft shown in the form of an armature, it is apparent that said device may be utilized in various ways to locate portions of any other machine relative to an intermediate member.

While the form of embodiment of the present invention as herein disclosed, constitutes a preferred form, it is to be understood that other forms might be adopted, all coming within the scope of the claims which follow.

What is claimed is as follows:

1. A device of the character described, comprising in combination, a bifurcated supporting yoke having parallel branches, one of which is provided with an angular extending portion; a pair of indicator arms coaxially pivoted in said yoke; a pointer arm having an apertured end adapted to fit upon the angular extending portion of said yoke so as to be maintained in longitudinal alignment therewith and so as to be adjustable relative thereto in a plane at right angles to the plane in which the indicator arms move; means interposed between the yoke and each indicator arm for maintaining the pointer arm centrally between the indicator arms; and means for locking said indicator arms against movement.

2. A device of the character described, comprising in combination, a supporting member including a handle portion provided with spaced, parallel branches, each having an elongated slot, both in alignment one of said branches having an angular portion extending outwardly therefrom; an indicator arm having an apertured end adjustably fitting upon said angular extending portion so that the indicator arm is maintained in alignment with said branch and is adjustable longitudinally of the extending portion; a pair of indicator arms coaxially pivoted between said branches; and means for maintaining the branches of the supporting member centrally between the indicator arms, said means including levers each having elongated hollow bearing portions at their one end, one of which is slidably supported in the slot of one supporting member branch, the bearing of the other lever being slidably supported in the slot of the other branch, a pin fitting snugly in said bearing portions to maintain aligned operation of both in their respective slots, the other ends of said levers being pivotally anchored to their respective indicator arms.

3. A device of the character described, the combination with a bifurcated supporting member including a handle having spaced, parallel branch portions forming a yoke, one branch having an angular, upturned end; a screw stud passing through the yoke branches adjacent the handle; a pair of indicator arms pivoted on said stud; a pointer receiving arm having an apertured end adjustably fitting upon the upturned end of the one yoke branch so as to maintain said arm in longitudinal alignment with the yoke branches and permit its adjustment relative to the supporting branch in a direction at right angles to the plane in which the indicator arms move; and a pointer adjustably secured in a longitudinal passage in the pointer arm.

4. A device for locating points on the opposite sides of a given point, said device comprising in combination, a supporting yoke; a pair of indicator arms coaxially pivoted in said yoke; means slidably supported on the yoke and connected with said arms for causing them, when operated, to move concurrently and through equal arcs, said means maintaining the supporting yoke centrally of said arms; an indicator pointer movably supported on the yoke so as to be adjustable relative thereto in a direction at right angles to the movement of the indicator arms, and so as to be maintained in longitudinal alignment with the yoke; and a graduated plate secured to one of said arms and cooperating with the other arm to indicate the spacing of said arms relative to the indicator pointer.

In testimony whereof I hereto affix my signature.

WALTER W. RIEDEL.